United States Patent
Ogawa et al.

(10) Patent No.: US 11,015,546 B2
(45) Date of Patent: May 25, 2021

(54) ELECTROMAGNETIC VALVE DRIVE DEVICE

(71) Applicant: KEIHIN CORPORATION, Tokyo (JP)

(72) Inventors: Atsushi Ogawa, Utsunomiya (JP); Motoaki Kato, Utsunomiya (JP); Kengo Nomura, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 8 days.

(21) Appl. No.: 16/512,819

(22) Filed: Jul. 16, 2019

(65) Prior Publication Data

US 2020/0102861 A1    Apr. 2, 2020

(30) Foreign Application Priority Data

Sep. 27, 2018   (JP) ............... JP2018-181629

(51) Int. Cl.
   *F02D 41/20*   (2006.01)
   *F01L 9/04*    (2006.01)

(52) U.S. Cl.
   CPC ........... *F02D 41/20* (2013.01); *F01L 9/04* (2013.01); *F02D 2041/201* (2013.01); *F02D 2041/2003* (2013.01); *F02D 2041/2006* (2013.01); *F02D 2041/2068* (2013.01); *F02D 2041/2075* (2013.01)

(58) Field of Classification Search
   CPC ..... F02D 2041/2003; F02D 2041/2006; F02D 2041/201
   See application file for complete search history.

(56) References Cited

U.S. PATENT DOCUMENTS

| | | | | |
|---|---|---|---|---|
| 3,613,644 A | * | 10/1971 | Porsche | F02D 41/20 123/490 |
| 5,959,825 A | * | 9/1999 | Harcombe | F02D 41/20 361/152 |
| 6,832,601 B2 | * | 12/2004 | Watanabe | F02D 41/20 123/480 |
| 7,117,852 B2 | * | 10/2006 | Santero | F01L 9/02 123/490 |
| 7,552,718 B2 | * | 6/2009 | Engel | F02D 41/2096 123/490 |
| 8,018,216 B2 | * | 9/2011 | Kakehi | F02D 41/20 323/288 |
| 8,081,498 B2 | * | 12/2011 | Mayuzumi | F02D 41/20 363/59 |
| 8,514,541 B2 | * | 8/2013 | Hatanaka | F02D 41/20 361/152 |
| 8,555,859 B2 | * | 10/2013 | Wirrer | F02D 41/20 123/478 |

(Continued)

*Primary Examiner* — Kevin R Steckbauer
(74) *Attorney, Agent, or Firm* — Cantor Colburn LLP

(57) ABSTRACT

An electromagnetic valve drive device includes: a state detection unit configured to detect an on-state or an off-state of a first switch and a second switch forming a boosting circuit; a boosting control unit configured to control a boosting operation, by performing a synchronous rectification control on switching of the first switch and the second switch, depending on the state of the first switch or the second switch detected by the state detection unit; and a drive circuit configured to drive an electromagnetic valve by supplying a voltage boosted by the boosting operation to the electromagnetic valve.

6 Claims, 3 Drawing Sheets

(56) References Cited

U.S. PATENT DOCUMENTS

| | | | | |
|---|---|---|---|---|
| 8,694,228 B2* | 4/2014 | Kitamura | | F02D 41/20 |
| | | | | 701/104 |
| 8,725,392 B2* | 5/2014 | Bolz | | F02D 41/20 |
| | | | | 701/113 |
| 9,062,624 B2* | 6/2015 | Archer | | F02D 41/20 |
| 9,188,101 B2* | 11/2015 | Sakakibara | | B60R 16/03 |
| 9,322,354 B2* | 4/2016 | Nishida | | F02D 41/28 |
| 9,476,330 B2* | 10/2016 | Kojima | | F02D 41/20 |
| 9,644,562 B2* | 5/2017 | Fujita | | F02D 41/20 |
| 9,714,626 B2* | 7/2017 | Hatanaka | | F02M 63/0017 |
| 9,729,058 B2* | 8/2017 | Larosa | | H02M 3/156 |
| 9,777,667 B2* | 10/2017 | Fukuda | | F02D 41/38 |
| 9,926,874 B2* | 3/2018 | Kusakabe | | F02D 41/20 |
| 10,082,116 B2* | 9/2018 | Eichenseher | | F02D 41/20 |
| 10,087,870 B2* | 10/2018 | Imai | | F02D 41/20 |
| 10,125,706 B2* | 11/2018 | Viele | | F02D 41/26 |
| 10,138,861 B2* | 11/2018 | Ishida | | F02P 9/002 |
| 10,227,943 B2* | 3/2019 | Fukuzumi | | F02D 41/20 |
| 10,267,253 B2* | 4/2019 | Okonogi | | F02D 41/32 |
| 10,284,091 B2* | 5/2019 | Kuroda | | H02M 3/1582 |
| 10,428,759 B2* | 10/2019 | Kiuchi | | F02D 41/062 |
| 10,569,777 B2* | 2/2020 | Hasan | | B60W 30/18018 |
| 10,598,117 B2* | 3/2020 | Nambu | | H02M 3/155 |
| 10,634,084 B2* | 4/2020 | Imai | | F02D 41/20 |
| 10,666,129 B2* | 5/2020 | Okonogi | | F02D 41/3064 |
| 10,669,964 B2* | 6/2020 | Nagata | | G01R 31/64 |
| 2004/0155121 A1* | 8/2004 | Watanabe | | F02D 41/20 |
| | | | | 239/533.2 |
| 2006/0075994 A1* | 4/2006 | Santero | | H03K 17/08142 |
| | | | | 123/490 |
| 2008/0042624 A1* | 2/2008 | Augesky | | H02N 2/067 |
| | | | | 320/166 |
| 2008/0308070 A1* | 12/2008 | Engel | | F02D 41/2096 |
| | | | | 123/490 |
| 2009/0015223 A1* | 1/2009 | Kakehi | | H02M 3/00 |
| | | | | 323/282 |
| 2009/0243574 A1* | 10/2009 | Mayuzumi | | F02D 41/20 |
| | | | | 323/282 |
| 2009/0251103 A1* | 10/2009 | Yamamoto | | B60L 58/27 |
| | | | | 320/133 |
| 2011/0220069 A1* | 9/2011 | Hatanaka | | F02D 41/20 |
| | | | | 123/490 |
| 2011/0283975 A1* | 11/2011 | Wirrer | | F02D 41/20 |
| | | | | 123/478 |
| 2012/0192837 A1* | 8/2012 | Kitamura | | F02D 41/20 |
| | | | | 123/480 |
| 2012/0227710 A1* | 9/2012 | Bolz | | F02D 41/20 |
| | | | | 123/490 |
| 2012/0279477 A1* | 11/2012 | Archer | | F02D 41/20 |
| | | | | 123/480 |
| 2013/0104856 A1* | 5/2013 | Fukuda | | F02D 41/32 |
| | | | | 123/490 |
| 2013/0257062 A1* | 10/2013 | Sakakibara | | F02N 11/0814 |
| | | | | 290/38 R |
| 2014/0121939 A1* | 5/2014 | Viele | | H02M 3/1584 |
| | | | | 701/102 |
| 2014/0123960 A1* | 5/2014 | Imai | | F02D 41/20 |
| | | | | 123/490 |
| 2014/0316679 A1* | 10/2014 | Nishida | | F02D 41/20 |
| | | | | 701/104 |
| 2015/0152820 A1* | 6/2015 | Kojima | | F01L 9/04 |
| | | | | 123/479 |
| 2015/0226165 A1* | 8/2015 | Eichenseher | | F02M 51/061 |
| | | | | 123/490 |
| 2015/0377176 A1* | 12/2015 | Hatanaka | | F02M 51/061 |
| | | | | 137/554 |
| 2016/0160783 A1* | 6/2016 | Fujita | | F02D 41/221 |
| | | | | 701/103 |
| 2016/0177855 A1* | 6/2016 | Kusakabe | | F02M 65/005 |
| | | | | 123/490 |
| 2016/0363076 A1* | 12/2016 | Kojima | | F02D 41/20 |
| 2017/0085178 A1* | 3/2017 | Larosa | | H02M 3/156 |
| 2017/0138289 A1* | 5/2017 | Okonogi | | F02D 41/221 |
| 2017/0268449 A1* | 9/2017 | Nagata | | F02D 41/221 |
| 2017/0335789 A1* | 11/2017 | Kiuchi | | F02D 41/062 |
| 2017/0346401 A1* | 11/2017 | Kuroda | | H02M 1/08 |
| 2018/0066597 A1* | 3/2018 | Fukuzumi | | F02D 41/20 |
| 2018/0229730 A1* | 8/2018 | Hasan | | H02J 7/0063 |
| 2018/0230923 A1* | 8/2018 | Tsukio | | F02M 51/00 |
| 2018/0245562 A1* | 8/2018 | Ishida | | F02P 3/00 |
| 2018/0363584 A1* | 12/2018 | Imai | | F02D 41/20 |
| 2019/0093589 A1* | 3/2019 | Nambu | | H02M 3/156 |
| 2019/0109534 A1* | 4/2019 | Okonogi | | F02D 41/22 |
| 2020/0072374 A1* | 3/2020 | Hagiwara | | H01M 8/04201 |
| 2020/0102861 A1* | 4/2020 | Ogawa | | F01L 9/04 |
| 2020/0132012 A1* | 4/2020 | Kuroda | | F02M 51/061 |
| 2020/0191105 A1* | 6/2020 | Ogawa | | B05B 1/3053 |

* cited by examiner

ELECTROMAGNETIC VALVE DRIVE DEVICE

CROSS-REFERENCE TO RELATED APPLICATION

The present application claims priority under 35 U.S.C. § 119 to Japanese Patent Application No. 2018-181629, filed on Sep. 27, 2018, the content of which is incorporated herein by reference.

BACKGROUND OF THE INVENTION

Field of the Invention

The present invention relates to an electromagnetic valve drive device.

Description of Related Art

Japanese Unexamined Patent Application, First Publication No. 2012-158985A discloses a fuel injection valve drive device which opens a fuel injection valve, by boosting a voltage of a battery (hereinafter referred to as a "battery voltage") by a boost circuit, and supplying the boosted voltage (hereinafter referred to as an "output voltage") to the fuel injection valve.

The boost circuit is configured to include an inductor, a first switch, a second switch, a diode, and an output capacitor. More specifically, one end of the inductor is connected to a battery power supply, and the other end thereof is connected to an anode of the diode. The first switch is connected between the other end of the inductor and a ground level. The second switch is connected in parallel with the diode. An output capacitor is connected between a cathode of the diode and the ground level.

With such a configuration, the fuel injection valve drive device accumulates energy in the inductor when the first switch is in an on-state and the second switch is in an off-state. Further, the fuel injection valve drive device can execute a synchronous rectification control of supplying the energy to the output capacitor via the second switch, by turning the second switch to the on-state after controlling the first switch such that it is brought into the off-state.

As a result, since the current flowing to the diode can be reduced, the heat generation of the diode can be suppressed and the loss can be reduced.

Incidentally, in the above-mentioned fuel injection valve drive device, when executing the synchronous rectification control, in order to prevent the first switch and the second switch from being simultaneously set to the turned-on state, a so-called dead time period is provided by setting the second switch to the turn-on state after measuring a predetermined time with a timer after executing the turn-off operation for the first switch.

However, when the resolution of time setting of the timer is low, it is necessary to set the dead time period to be longer than necessary from the viewpoint of safety. Therefore, in the synchronous rectification control, the period of time during which the first switch and the second switch are in the off-state becomes longer. As a result, the time for which the energy accumulated in the inductor is supplied to the output capacitor via the diode becomes longer, and it is not possible to improve the effect on the loss reduction of the diode due to the execution of the synchronous rectification control.

The present invention has been made in view of such circumstances, and an object thereof is to provide an electromagnetic valve drive device capable of suppressing heat generation caused by a diode in the synchronous rectification control.

SUMMARY OF THE INVENTION

An aspect of the present invention is an electromagnetic valve drive device including: a boost circuit configured to be capable of executing a boosting operation of boosting an input voltage, by accumulating energy in an inductor when a first switch is in an on-state and a second switch is in an off-state, and by supplying the energy accumulated in the inductor to an output capacitor when the first switch is in the off-state and the second switch is in the on-state; a state detection unit configured to detect the on-state or the off-state of the first switch and the second switch; a boosting control unit configured to control the boosting operation, by performing a synchronous rectification control on switching of the first switch and the second switch, depending on the state of the first switch or the second switch detected by the state detection unit; and a drive circuit configured to drive the electromagnetic valve by supplying the voltage boosted by the boosting operation to the electromagnetic valve.

An aspect of the present invention is the electromagnetic valve drive device, wherein the boost control unit controls the second switch such that it is brought into the on-state from the off-state when the off-state of the first switch is detected by the state detection unit, and controls the first switch such that it is brought into the on-state from the off-state when the off-state of the second switch is detected.

An aspect of the present invention is the electromagnetic valve drive device wherein the first switch or the second switch enters the on-state or the off-state, depending on the voltage applied to the control terminal, and the state detection unit reads a voltage applied to a control terminal of the first switch or the second switch, and when the voltage value of the read voltage is equal to or less than a threshold value, the state detection unit determines that the first switch or the second switch is in the off-state.

An aspect of the present invention is the electromagnetic valve drive device wherein the first switch and the second switch are a MOSFET.

An aspect of the present invention is the electromagnetic valve drive device wherein the electromagnetic valve is a fuel injection valve configured to inject a fuel into an internal combustion engine.

As described above, according to the electromagnetic valve drive device of the above aspect, heat generation caused by the diode can be suppressed in the synchronous rectification control.

DETAILED DESCRIPTION OF THE INVENTION

Hereinafter, a fuel injection valve drive device according to an embodiment of the present invention will be described using drawings.

A fuel injection valve drive device A according to the present embodiment is a drive device that drives a fuel injection valve L. That is, the fuel injection valve drive device A according to the present embodiment is an electromagnetic valve drive device that drives the fuel injection valve L (an electromagnetic valve) that injects fuel to an internal combustion engine mounted on a vehicle.

Figure 1:
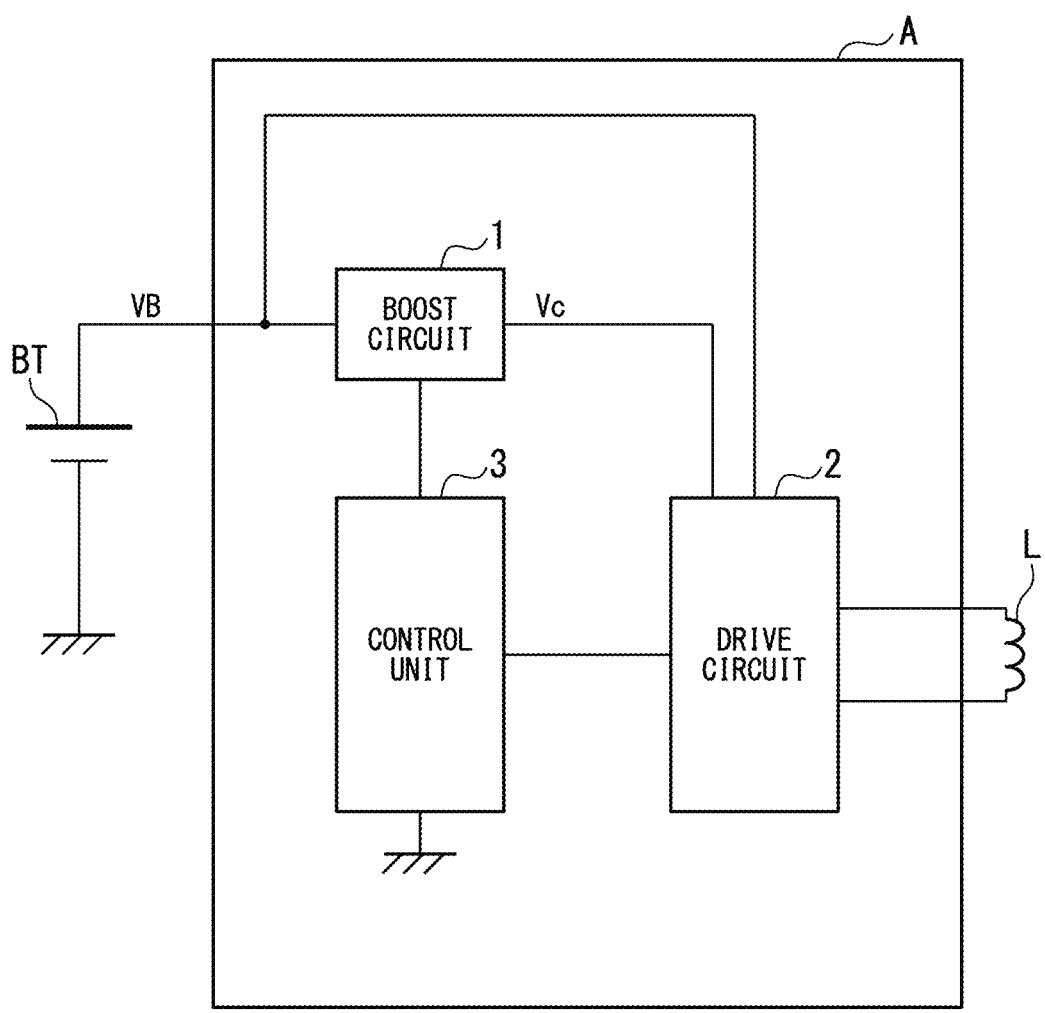
FIG. 1 is a schematic configuration diagram of a fuel injection valve drive device A according to an embodiment of the present invention.

As illustrated in FIG. 1, the fuel injection valve drive device A includes a boost circuit 1, a drive circuit 2, and a control unit 3.

The boost circuit 1 is a chopper circuit capable of executing a boosting operation for boosting a battery voltage VB that is input from a battery BT mounted on a vehicle to a predetermined target voltage (a boosted voltage Vc). The boost circuit 1 generates a predetermined boosted voltage Vc from the battery voltage VB by executing the boosting operation. The boost circuit 1 has a boosting ratio of, for example, about ten to several tens, and the boosting operation is controlled by the control unit 3. Further, the boost circuit 1 has functions of both synchronous rectification and asynchronous rectification. Here, the battery voltage VB is an example of the "input voltage" of the present invention.

The drive circuit 2 supplies the battery voltage VB or the boosted voltage Vc to the fuel injection valve L on the basis of the drive signal from control unit 3. For example, when the drive circuit 2 acquires a first drive signal from the control unit 3, the drive circuit 2 opens the fuel injection valve L, by supplying the boosted voltage Vc to the fuel injection valve L. Further, when the drive circuit 2 acquires a second drive signal from the control unit 3, the drive circuit 2 maintains the open state of the fuel injection valve L after the valve opening, by supplying the battery voltage VB to the fuel injection valve L.

The control unit 3 is, for example, an integrated circuit (IC) that controls the boost circuit 1 and the drive circuit 2 on the basis of a command signal that is input from an upper control system.

A configuration of the boost circuit 1 according to an embodiment of the present invention will be specifically described below with reference to FIG. 2.

Figure 2:
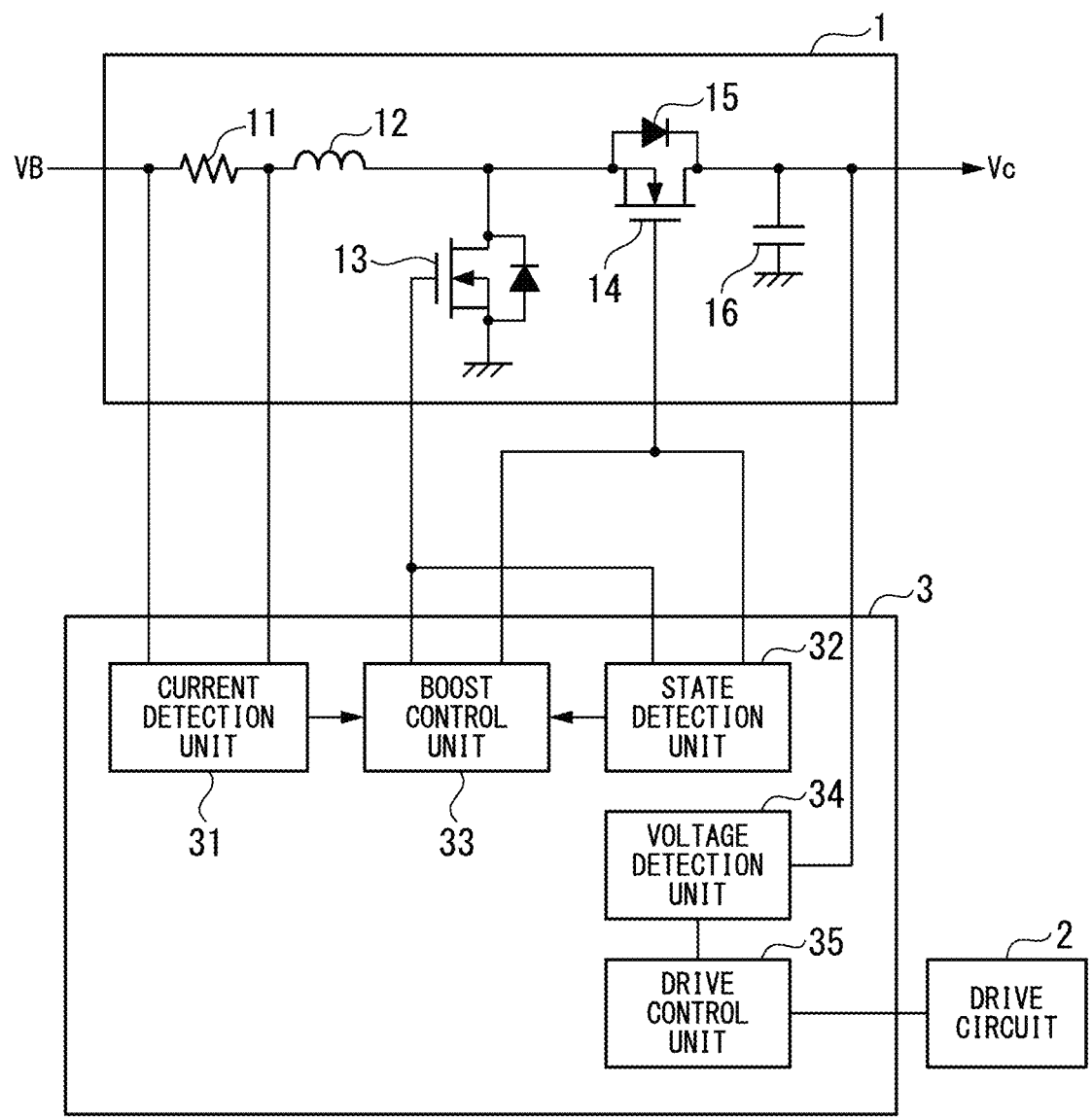
FIG. 2 is a schematic configuration diagram of a control unit 3 according to an embodiment of the present invention.

As illustrated in FIG. 2, the boost circuit 1 includes a shunt resistor 11, an inductor 12, a first switch 13, a second switch 14, a rectifying diode 15, and an output capacitor 16.

One end of the shunt resistor 11 is connected to a positive terminal of the battery BT, and the other end thereof is connected to one end of the inductor 12.

The other end of the inductor 12 is connected to the first switch and the second switch. Further, the other end of the inductor is connected to the anode of the rectifying diode 15.

The first switch 13 is a metal oxide semiconductor field effect transistor (MOSFET). A drain terminal of the first switch 13 is connected to the other end of the inductor 12, and a source terminal thereof is connected to a negative terminal of the battery BT. Further, a gate terminal (a control terminal) of the first switch 13 is connected to the control unit 3.

The second switch 14 is a MOSFET. A source terminal of the second switch 14 is connected to the other end of the inductor 12 and the drain terminal of the first switch 13, and a drain terminal thereof is connected to one end of the output capacitor 16. Further, a gate terminal (control terminal) of the second switch 14 is connected to the control unit 3. The second switch 14 is a synchronous rectification element in the boost circuit 1 and is a MOSFET having a small on-resistance.

The rectifying diode 15 is connected in parallel to the second switch 14. That is, an anode of the rectifying diode 15 is connected to the source terminal of the second switch 14, and a cathode thereof is connected to the drain terminal of the second switch 14. Further, the rectifying diode 15 is an asynchronous rectification element in the boost circuit 1.

One end of the output capacitor 16 is connected to the cathode of the rectifying diode 15, the drain terminal of the second switch 14, and the drive circuit 2. Further, the other end of the output capacitor 16 is connected to the negative terminal of the battery BT.

The configuration of the control unit 3 according to an embodiment of the invention will be specifically described below using FIG. 2.

The control unit 3 includes a current detection unit 31, a state detection unit 32, a boost control unit 33, a voltage detection unit 34, and a drive control unit 35.

The current detection unit 31 detects a current value (hereinafter, referred to as a "charging current value") flowing through the inductor 12 via the shunt resistor 11. Specifically, the current detection unit 31 detects the charge current value, by measuring a potential difference between both ends of the shunt resistor 11.

The state detection unit 32 detects the on-state or the off-state of the first switch 13 and the second switch 14. That is, the state detection unit 32 detects whether the first switch 13 is in the on-state or the off-state. Further, the state detection unit 32 detects whether the second switch 14 is in the on-state or the off-state.

For example, the state detection unit 32 is connected to the gate terminal of the first switch 13, and acquires a voltage (hereinafter referred to as a "gate voltage") Vg1 of the gate terminal. Further, when the acquired gate voltage Vg1 of the first switch 13 is equal to or higher than a first threshold value Vth1, the state detection unit 32 determines that the first switch 13 is in the on-state. The first threshold value Vth1 is a gate voltage required to turn on the first switch 13.

Further, when the acquired gate voltage Vg1 of the first switch 13 is equal to or less than a second threshold value Vth2 (<first threshold value Vth1), the state detection unit 32 determines that the first switch 13 is in the off-state. The second threshold value Vth2 is a gate voltage at which the first switch 13 is in the off-state.

For example, the state detection unit 32 is connected to the gate terminal of the second switch 14, and acquires the gate voltage Vg2 of the gate terminal. Further, when the acquired gate voltage Vg2 of the second switch 14 is equal to or higher than a third threshold value Vth3, the state detection unit 32 determines that the second switch 14 is in the on-state. The third threshold value Vth3 is a gate voltage required to set the second switch 14 to the on-state.

Further, when the acquired gate voltage Vg2 of the second switch 14 is equal to or less than a fourth threshold value Vth4 (<third threshold value Vth3), the state detection unit 32 determines that the second switch 14 is in the off-state. The fourth threshold value Vth4 is a voltage at which the second switch 14 is in the off-state.

The boost control unit 33 is connected to each of the gate terminals of the first switch 13 and the second switch 14. The boost control unit 33 controls the on-state or the off-state of the first switch 13 and the second switch 14 to execute the boosting operation of the boost circuit 1. Specifically, the boost control unit 33 outputs the first control signal to the gate terminal of the first switch 13 to control the first switch 13 to the on-state. Further, the first control signal is a voltage equal to or higher than the first threshold value Vth1. The boost control unit 33 outputs the second control signal to the gate terminal of the second switch 14 to control the second switch 14 to the on-state. Further, the second control signal is a voltage equal to or higher than the third threshold value Vth3.

Here, one of the features of the boost control unit 33 according to the present embodiment is to perform a synchronous rectification control of switching of the first switch 13 and the second switch 14 to execute the boosting operation, depending on the state of the first switch 13 or the second switch 14 detected by the state detection unit 32. That is, the boost control unit 33 certainly checks that the first switch 13 is in the off-state, and controls the second switch 14 to the on-state after the checking. This makes it possible to prevent the first switch 13 and the second switch 14 from being simultaneously in the on-state without using a timer.

The voltage detection unit 34 detects the voltage that is output from the boost circuit 1, that is, the boosted voltage Vc. For example, the voltage detection unit 34 detects the boosted voltage Vc by resistive-dividing and acquiring the voltage (boosted voltage Vc) that is output from one end of the output capacitor 16. The voltage detection unit 34 outputs the detected boosted voltage Vc to the drive control unit 35.

The drive control unit 35 controls the drive circuit 2. Specifically, the drive control unit 35 outputs the first drive signal to the drive circuit 2 when the boosted voltage Vc detected by the voltage detection unit 34 becomes equal to or higher than a predetermined value.

Further, the drive control unit 35 outputs the second drive signal to the drive circuit 2 to hold the valve opening of the fuel injection valve L after the valve opening.

Hereinafter, the operation of the fuel injection valve drive device A according to an embodiment of the present invention will be described in detail. First, the operation of the fuel injection valve drive device A with respect to the fuel injection valve L will be described.

When the fuel injection valve L is driven from the closed state to the opened state by the fuel injection valve drive device A, the drive control unit 35 supplies the boosted voltage Vc generated by the boost circuit 1 to the fuel injection valve L. Therefore, first, the boost control unit 33 performs the synchronous rectification control of the switching of the first switch 13 and the second switch 14, thereby performing the boosting operation on the boost circuit 1 to generate the boosted voltage Vc.

Further, the drive control unit 35 supplies the boosted voltage Vc to the fuel injection valve L when the boosted voltage Vc detected by the voltage detection unit 34 becomes equal to or greater than a predetermined value. As a result, a peak rising current flows to the fuel injection valve L. Such a peak rising current speeds up the valve opening operation of the fuel injection valve L.

When the fuel injection valve L is opened, the drive control unit 35 supplies the battery voltage BT lower than the boosted voltage Vc to the fuel injection valve L to maintain the open state of the fuel injection valve L. As a result, the open state of the fuel injection valve L is maintained.

Figure 3:
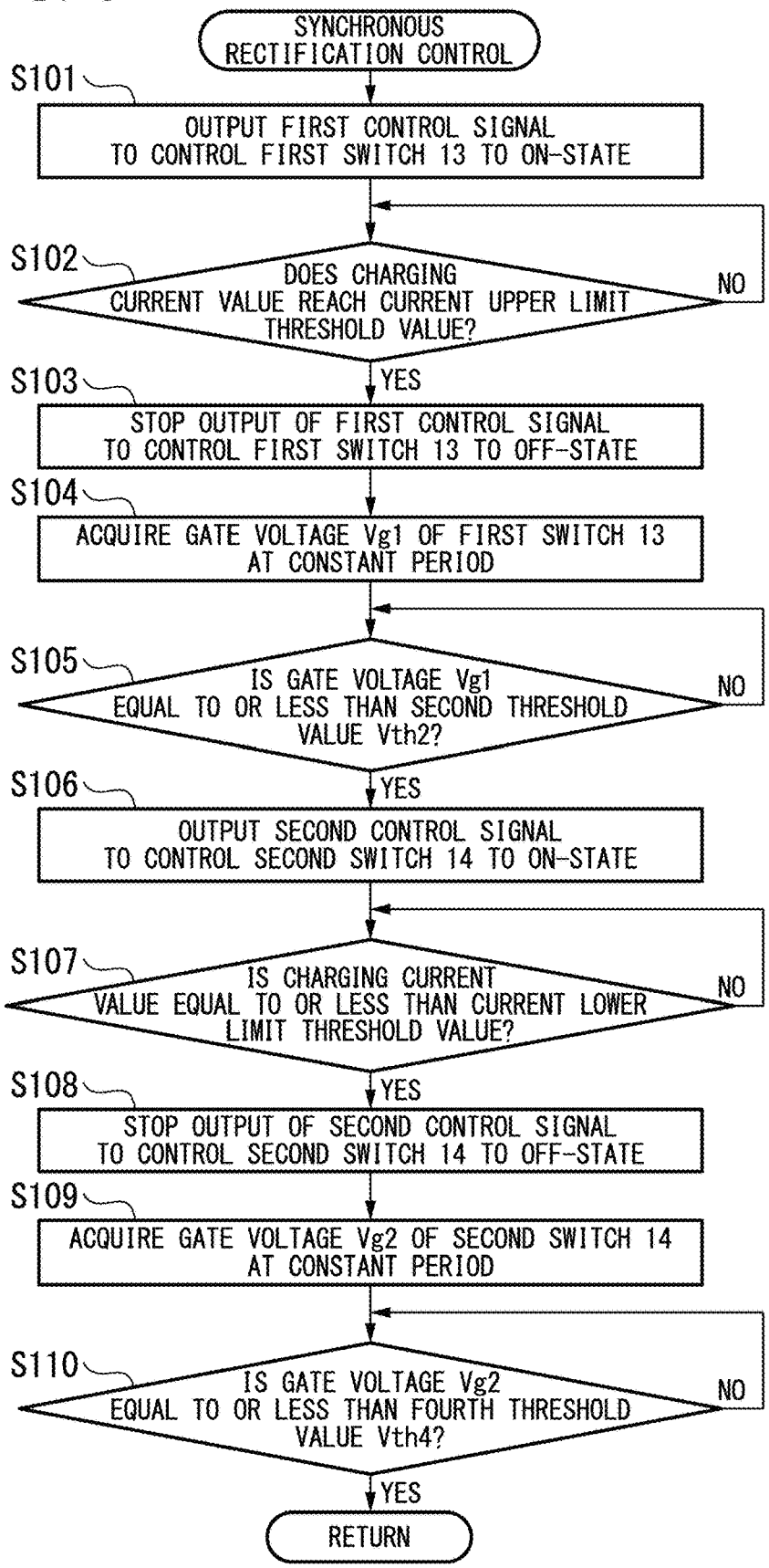
FIG. 3 is a diagram illustrating a flow of a synchronous rectification control in the fuel injection valve drive device A according to an embodiment of the present invention.

Next, the operation of the synchronous rectification control in the fuel injection valve drive device A will be described with reference to FIG. 3.

First, the boost control unit 33 outputs the first control signal to the gate terminal of the first switch 13 to set the first switch 13 to the on-state when the second switch 14 is in the off-state (step S101). As a result, the gate voltage Vg1 of the first switch 13 rises, and when the gate voltage Vg1 becomes equal to or higher than the first threshold value Vth1, the switch enters the on-state. Thus, the battery voltage BT is applied to the inductor 12 and energy is accumulated in the inductor 12.

After outputting the first control signal, the boost control unit 33 determines whether the charging current value detected by the current detection unit 31 has reached a preset current upper limit threshold value (step S102). When it is determined that the charging current value detected by the current detection unit 31 has reached the current upper limit threshold value, the boost control unit 33 stops the output of the first control signal to control the first switch 13 to the off-state (step S103). On the other hand, when it is determined that the charging current value detected by current detection unit 31 does not reach the current upper limit threshold value, the boost control unit 33 continues outputting the first control signal, and performs the process of step S102 again.

When the output of the first control signal is stopped by the boost control unit 33, the voltage value of the gate voltage Vg1 gradually decreases, and the first switch 13 enters the off-state when the voltage becomes equal to or less than the second threshold value Vth2. Therefore, when the output of the first control signal is stopped by the boost control unit 33, the state detection unit 32 acquires the gate voltage Vg1 of the first switch 13 in a constant cycle (step S104), and determines whether the acquired gate voltage Vg1 is equal to or less than a second threshold value Vth2 (step S105).

When it is determined that the gate voltage Vg1 is equal to or less than the second threshold value Vth2, the state detection unit 32 determines that the first switch 13 changes from the on-state to the off-state. Further, when the state detection unit 32 determines that the first switch 13 changes from the on-state to the off-state, the boost control unit 33 outputs the second control signal to control the second switch 14 to the on-state (step S106). Therefore, when the second switch 14 is turned on, it is possible to prevent the first switch 13 and the second switch 14 from simultaneously entering the on-state without using a timer. That is, when the second switch 14 is turned on, it is possible to prevent the first switch 13 and the second switch 14 from simultaneously entering the on-state, without setting the dead time period to be longer than necessary.

When the second control signal is output to the second switch 14, the voltage value of the gate voltage Vg2 gradually increases, and the second switch 14 enters the on-state when the voltage becomes equal to or higher than the third threshold value Vth3. Here, the energy accumulated in the inductor 12 is supplied to the output capacitor 16 via the rectifying diode 15 until the second switch 14 is in the on-state. Further, when the second switch 14 is in the on-state, the energy accumulated in the inductor 12 is supplied to the output capacitor 16 via the second switch 14.

After outputting the second control signal, the boost control unit 33 determines whether the charging current value detected by the current detection unit 31 has become equal to or less than a preset current lower limit threshold value (<current upper limit threshold) (step S107). When it is determined that the charging current value detected by the current detection unit 31 has become equal to or less than the current lower limit threshold value, the boost control unit 33 stops the output of the second control signal to control the second switch 14 to the off-state (step S108). On the other hand, when it is determined that the charging current value detected by the current detection unit 31 does not become equal to or lower than the current lower limit threshold value, the boost control unit 33 continues outputting the second control signal, and performs the process of step S107 again.

When the output of the second control signal is stopped by the boost control unit 33, the voltage value of the gate voltage Vg2 gradually decreases, and the second switch 14 enters the off-state when the voltage value becomes equal to or less than the fourth threshold value Vth4. Therefore, when the boost control unit 33 stops the output of the second control signal, the state detection unit 32 acquires the gate voltage Vg2 of the second switch 14 at a constant cycle (step S109), and determines whether the acquired gate voltage Vg2 becomes equal to or less than the fourth threshold value Vth4 (step S110). Further, when it is determined that the gate voltage Vg2 becomes equal to or less than the second threshold value Vth2, the state detection unit 32 determines that the second switch 14 is switched from the on-state to the off-state.

When the state detection unit 32 determines that the second switch 14 changes from the on-state to the off-state, the boost control unit 33 returns to the process of step S101, and outputs the first control signal to control the first switch 13 to the on-state. Thus, even when the first switch 13 is turned on, it is possible to prevent the first switch 13 and the second switch 14 from simultaneously entering the on-state without using a timer. That is, even when the first switch 13 is turned on, the first switch 13 and the second switch 14 can be prevented from simultaneously entering the on-state without setting the dead time period to be longer than necessary.

As described above, the fuel injection valve drive device A according to an embodiment of the present invention includes: the state detection unit 32 configured to detect the on-state or the off-state of the first switch 13 and the second switch 14; and the boosting control unit 33 configured to control the boosting operation, by performing a synchronous rectification control on switching of the first switch 13 and the second switch 14, depending on the state of the first switch 13 or the second switch 14 detected by the state detection unit 32.

According to such a configuration, since there is no need for set the dead time period by the timer, the dead time period does not become longer than necessary. This makes it possible to shorten the time for which the energy accumulated in the inductor 12 is supplied to the output capacitor 16 via the rectifying diode 15. Therefore, in the synchronous rectification control, the heat generation due to the rectifying diode 15 can be suppressed, and the effect of loss reduction of the rectifying diode 15 can be enhanced.

Furthermore, since the charging efficiency to the output capacitor 16 can be improved by the reduction of the loss of the rectifying diode 15, the boost recovery capability of the boost circuit 1 can be improved. The boost recovery capability is to raise the boosted voltage Vc, which is lower than the opening of the fuel injection valve L, to a voltage value (predetermined value) necessary to open the fuel injection valve L again. That is, the fuel injection valve drive device A can shorten the time for raising the boosted voltage Vc, which is lower than the opening of the fuel injection valve L, to a predetermined value again, which contributes to the performance improvement of multi-stage injection.

The embodiment of the present invention has been described in detail with reference to the drawings. However, the specific configuration is not limited to this embodiment, and also includes design and the like within the scope of the present invention.

Although the aforementioned embodiment has described the case where the first switch 13 and the second switch 14 are a MOSFET, this invention is not limited thereto. For example, the first switch 13 and the second switch 14 may be an insulated gate bipolar transistor (IGBT), a relay, or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

A Fuel injection valve drive device
1 Boost circuit
2 Drive circuit
3 Control unit
12 Inductor
13 First switch
14 Second switch
15 Rectifying diode
16 Output capacitor
31 Current detection unit
32 State detection unit
33 Boost control unit
34 Voltage detection unit
35 Drive control unit
L Fuel injection valve

What is claimed is:

1. An electromagnetic valve drive device comprising:
a boost circuit configured to be capable of executing a boosting operation of boosting an input voltage, by accumulating energy in an inductor when a first switch is in an on-state and a second switch is in an off-state, and by supplying the energy accumulated in the inductor to an output capacitor when the first switch is in the off-state and the second switch is in the on-state;
a state detection circuit configured to detect the on-state or the off-state of the first switch and the second switch by receiving a signal from each of the first switch and the second switch;
a boosting control circuit configured to control the boosting operation, by performing a synchronous rectification control on switching of the first switch and the second switch, depending on a signal indicating the state of the first switch or the second switch detected by the state detection circuit; and
a drive circuit configured to drive the electromagnetic valve by supplying the voltage boosted by the boosting operation to the electromagnetic valve.

2. The electromagnetic valve drive device according to claim 1, wherein the boost control circuit controls the second switch from the off-state to the on-state when the off-state of the first switch is detected by the state detection circuit, and controls the first switch from the off-state to the on-state when the off-state of the second switch is detected.

3. The electromagnetic valve drive device according to claim 2, wherein the first switch or the second switch enters the on-state or the off-state, depending on the voltage applied to a control terminal of the respective first switch or second switch, and the state detection circuit reads a voltage applied to the control terminal of the first switch or the second switch, and when the voltage value of the read voltage is equal to or less than a threshold value, the state detection circuit determines that the first switch or the second switch is in the off-state.

4. The electromagnetic valve drive device according to claim 1, wherein the first switch and the second switch are a MOSFET.

5. The electromagnetic valve drive device according to claim 4, wherein the electromagnetic valve is a fuel injection valve configured to inject a fuel in an internal combustion engine.

6. The electromagnetic valve drive device according to claim 1, wherein the electromagnetic valve is a fuel injection valve configured to inject a fuel in an internal combustion engine.

* * * * *